US007714851B2

(12) United States Patent
Vuyyuru

(10) Patent No.: US 7,714,851 B2
(45) Date of Patent: May 11, 2010

(54) SINGLE SUPPLY VIDEO LINE DRIVER

(75) Inventor: Sameer Vuyyuru, San Jose, CA (US)

(73) Assignee: Intersil Americas Inc., Milpitas, CA (US)

( * ) Notice: Subject to any disclaimer, the term of this patent is extended or adjusted under 35 U.S.C. 154(b) by 947 days.

(21) Appl. No.: 11/204,227

(22) Filed: Aug. 15, 2005

(65) Prior Publication Data

US 2006/0049707 A1    Mar. 9, 2006

Related U.S. Application Data

(60) Provisional application No. 60/607,926, filed on Sep. 8, 2004.

(51) Int. Cl.
*G06F 3/038* (2006.01)
(52) U.S. Cl. ..................................... 345/204
(58) Field of Classification Search ................ 345/204, 345/211, 98, 100; 348/E5.068; 330/199
See application file for complete search history.

(56) References Cited

U.S. PATENT DOCUMENTS

| 5,153,574 | A  | * | 10/1992 | Kondo ........................ 345/88 |
| 7,183,857 | B2 | * | 2/2007  | Doy et al. ................... 330/297 |
| 7,236,203 | B1 | * | 6/2007  | Hojabri .................. 348/E5.07 |
| 2003/0189558 | A1 | * | 10/2003 | Aoki et al. ................. 345/204 |

OTHER PUBLICATIONS

"Design Trade-Offs for Single-Supply Op Amps", Apr. 3, 2005. Maxim Application Note 656.*
Mancini, Ron. Op Amps For Everyone. Aug. 2002. p. A-5-A-23.*
Munson, Jon and Raj Ramchandani, "Triple and Quad RGB Amplifiers Deliver Full Performance on 3.3V", Mar. 2003, Linear Technology Magazine.*
"Maxim: 80mW, DirectDrive, Stereo Headphone Amplifier with Common-Mode Sense," http://pdfserv.maxim-ic.com/en/ds/MAX4409.pdf, Maxim Integrated Products (Jun. 2004).
LM614 Datasheet, "Quad Operational Amplifier and Adjustable Reference," National Semiconductor Corporation, DS009326, Dec. 2001.
TSM104/A Datasheet, "Quad Operational Amplifier and Programmable Voltage Reference", STMicroelectronics, Feb. 1999.

* cited by examiner

*Primary Examiner*—Chanh Nguyen
*Assistant Examiner*—Allison Walthall
(74) *Attorney, Agent, or Firm*—Fliesler Meyer LLP

(57) ABSTRACT

Video line drivers that operate using a single external supply voltage, without the need for large external capacitors (e.g., 470 uF) on the output, are provided. In accordance with an embodiment, a video line driver includes a charge pump and a plurality of amplifiers. The charge pump uses the single external supply voltage to produce a further voltage having an opposite polarity than the external supply voltage. The plurality of amplifiers are each powered by the external supply voltage and the further voltage produced by the charge pump. Each amplifier receives a portion of a video signal and outputs an amplified version of the received portion of the video signal. The video signal can include, e.g., an R portion, a G portion and a B portion, or a Y portion, a Pb portion and a Pr portion. This abstract is not intended to be a complete description of the invention.

24 Claims, 5 Drawing Sheets

SINGLE SUPPLY VIDEO LINE DRIVER

PRIORITY CLAIM

This application claims priority under 35 U.S.C. 119(e) to U.S. Provisional Patent Application No. 60/607,926, filed Sep. 8, 2004.

FIELD OF THE INVENTION

The present invention relates to video line drivers that are used for driving a video display with video signals.

BACKGROUND

FIG. 1 illustrates one type of convention video line driver 110, which is powered by both an external positive power supply 120 (e.g., +5V) and an external negative power supply 122 (e.g., −5V). This is disadvantageous because it is more expensive to provide two external power supplies (i.e., a positive and a negative power supply) than to provide a single external power supply. Additionally, the dual power supply video line driver 110 draws more power than one that uses a single power supply.

FIG. 2 illustrates another type of convention video line driver 210, which is powered by a single external power supply 220 (e.g., +5V), but requires very large external capacitors (e.g., 470 uF) on the output to get rid of the DC offsets that occur when using a single voltage supply. This is disadvantageous because capacitors having a high capacitance are physically large as well as expensive.

It would be advantageous if the above mentioned disadvantages of conventional video line drivers could be overcome.

SUMMARY OF THE INVENTION

Embodiments of the present invention relate to video line drivers that operate using a single external supply voltage, without the need for large external capacitors (e.g., 470 uF) on the output. In accordance with an embodiment of the present invention, a video line driver includes a charge pump and a plurality of amplifiers. The charge pump uses the single external supply voltage to produce a further voltage having an opposite polarity than the external supply voltage. The plurality of amplifiers are each powered by the external supply voltage and the further voltage produced by the charge pump. Each amplifier receives a portion of a video signal and outputs an amplified version of the received portion of the video signal. The video signal can include, e.g., an R portion, a G portion and a B portion, or a Y portion, a Pb portion and a Pr portion.

Embodiments of the present invention are also directed to video line drivers that include a charge pump and a single amplifier.

In accordance with an embodiment of the present invention, each amplifier includes a first input, a second input and an output. The first input receives a portion of the video signal, and the second input receives an optional reference voltage. When the optional reference voltage is supplied to the second input, the output of the amplifier is an amplified version of the portion of the video signal with its analog level shifted down by an amount substantially equal to the reference voltage.

In accordance with an embodiment of the present invention, the switching performed within the charge pump is outside the frequency bandwidth of the video signal, in order to reduce and preferable avoid interference.

To preserve power, in accordance with an embodiment of the present invention, the charge pump produces a voltage (e.g., negative voltage) that has a lower amplitude than the amplitude produced by the external voltage supply (e.g., which provides a positive voltage), while still allowing the transistors within the amplifiers to operate properly.

This summary is not intended to be a complete description of the invention. Further embodiments, and the features, aspects, and advantages of the present invention will become more apparent from the detailed description set forth below, the drawings and the claims.

DETAILED DESCRIPTION

Embodiments of the present invention provide for true single power supply operation of a video line driver, without the need for large external capacitors at the output of the line driver. More specifically, in accordance with an embodiment of the present invention, a line driver is powered by a single external power supply (e.g., 3.3V) and generates a negative voltage internally (i.e., on the video line driver chip). This allows for DC-accurate coupling of video, e.g., onto a 75 ohm double-terminated line.

Figure 3A:
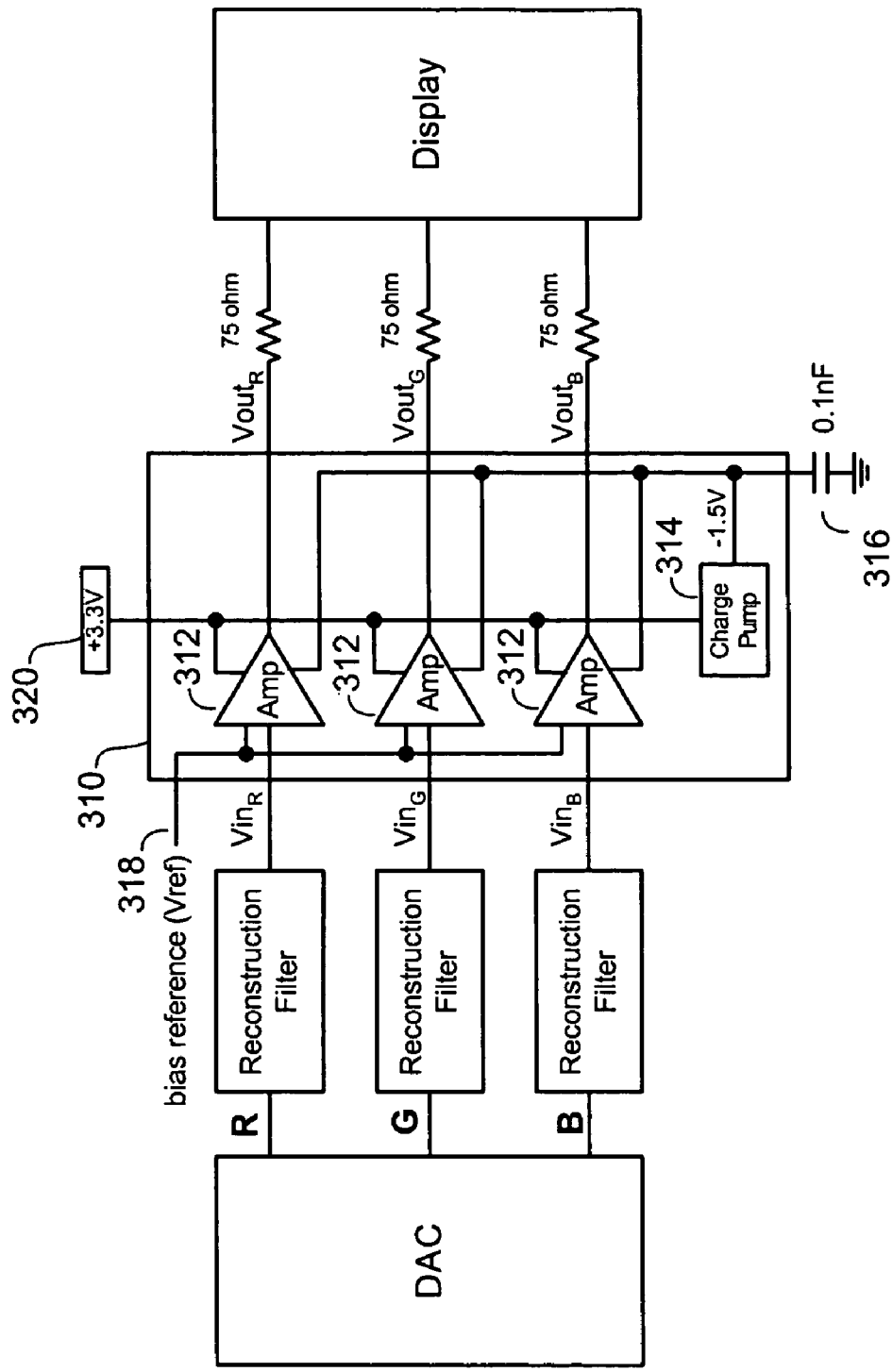
FIGS. 3A and 3B are high level diagrams of video line drivers that use a single external power supply, in accordance with embodiments of the present invention.

FIG. 3A illustrates a line driver 310 in accordance with an embodiment of the present invention. The line driver 310 is shown as including three amplifiers 312, one for the R portion of a video signal, one for the G portion of a video signal, and one for the B portion of a video signal. In another embodiment, the video signal can include Y, Pb and Pr portions, where Y is luminance, Pb is color difference of blue and Pr is color difference of red.

Each of the amplifiers receives a positive voltage (e.g., +3.3V) from an external positive power supply 320 and a negative voltage (e.g., −1.5V) from a charge pump 314 that is part of the video line driver 310. The charge pump 314, which is of the inverter type, uses a positive voltage from the positive power supply (e.g., 3.3V) to generate a negative voltage (e.g., −1.5V). The positive voltage provided by the external power supply 320 is also referred to hereafter as the positive rail voltage. The negative voltage generated by the charge pump 314 is also referred to hereafter as the negative rail voltage.

In accordance with an embodiment, to reduce and preferable avoid interference, the switching performed within the charge pump 314 is outside the frequency bandwidth of the video signal, which goes up to about 1 GHz. More specifically, in accordance with one embodiment of the present invention the switching within the charge pump 314 is at about 3.2 GHz.

In accordance with an embodiment of the present invention, the amplifiers 312 are made of bi-polar transistors, while the charge pump 314 is made of C-MOS transistors. For performance purposes, the amplifiers 312 are preferably produced using bi-polar transistors because they handle high resolution video better than C-MOS transistors. On the other hand, the charge pump 314 is preferably C-MOS based. Accordingly, the substrate of the video driver 310 preferably includes a mix of bi-polar and C-MOS transistors.

In accordance with an embodiment of the present invention, each amplifier 312 has a voltage gain of 2, which can also be expressed as a gain of 6 dB. However, other gains are also possible.

Figure 1:
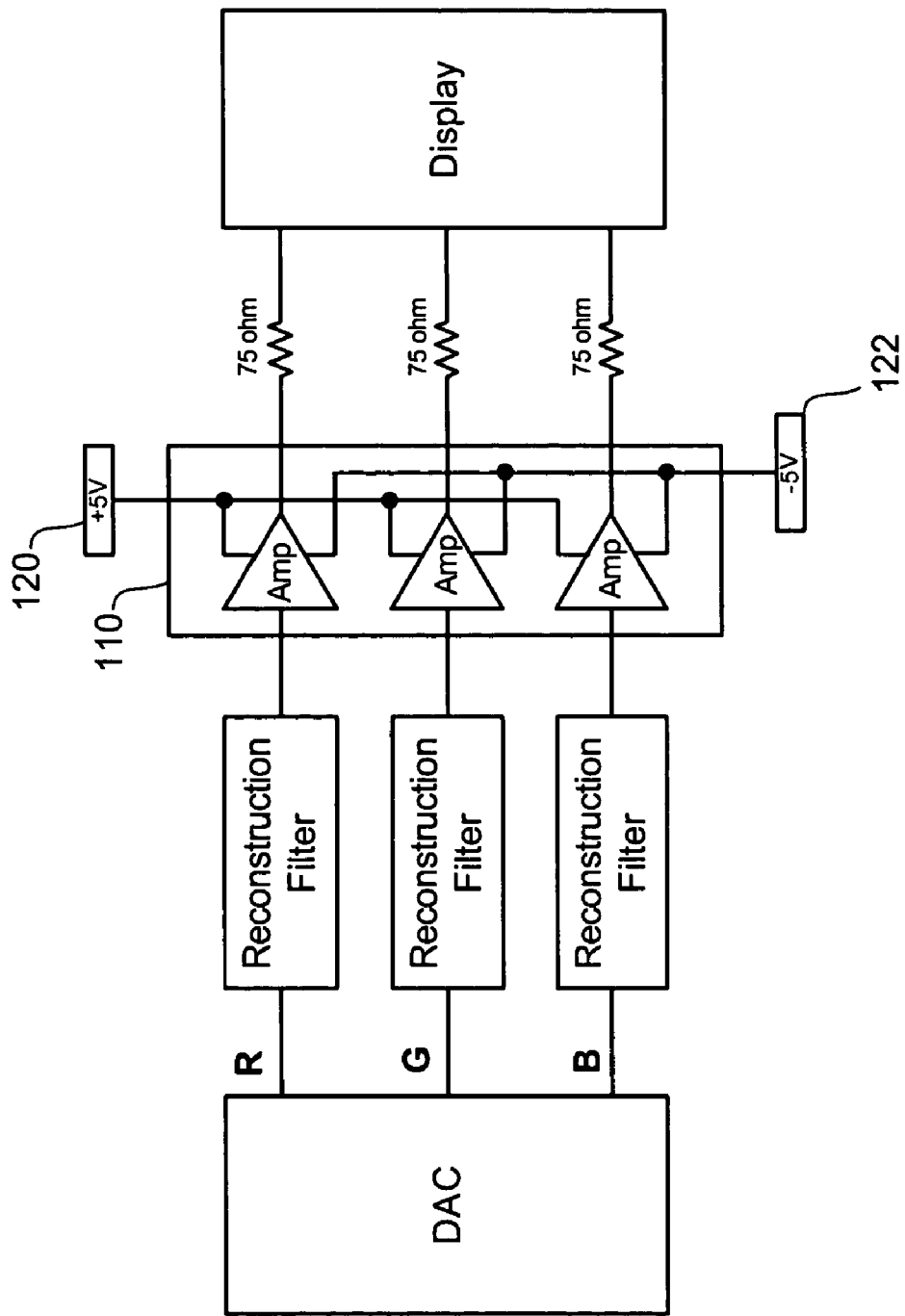
FIG. 1 is a high level diagram that is useful for describing a conventional video line driver that requires two external power supplies.
Figure 2:
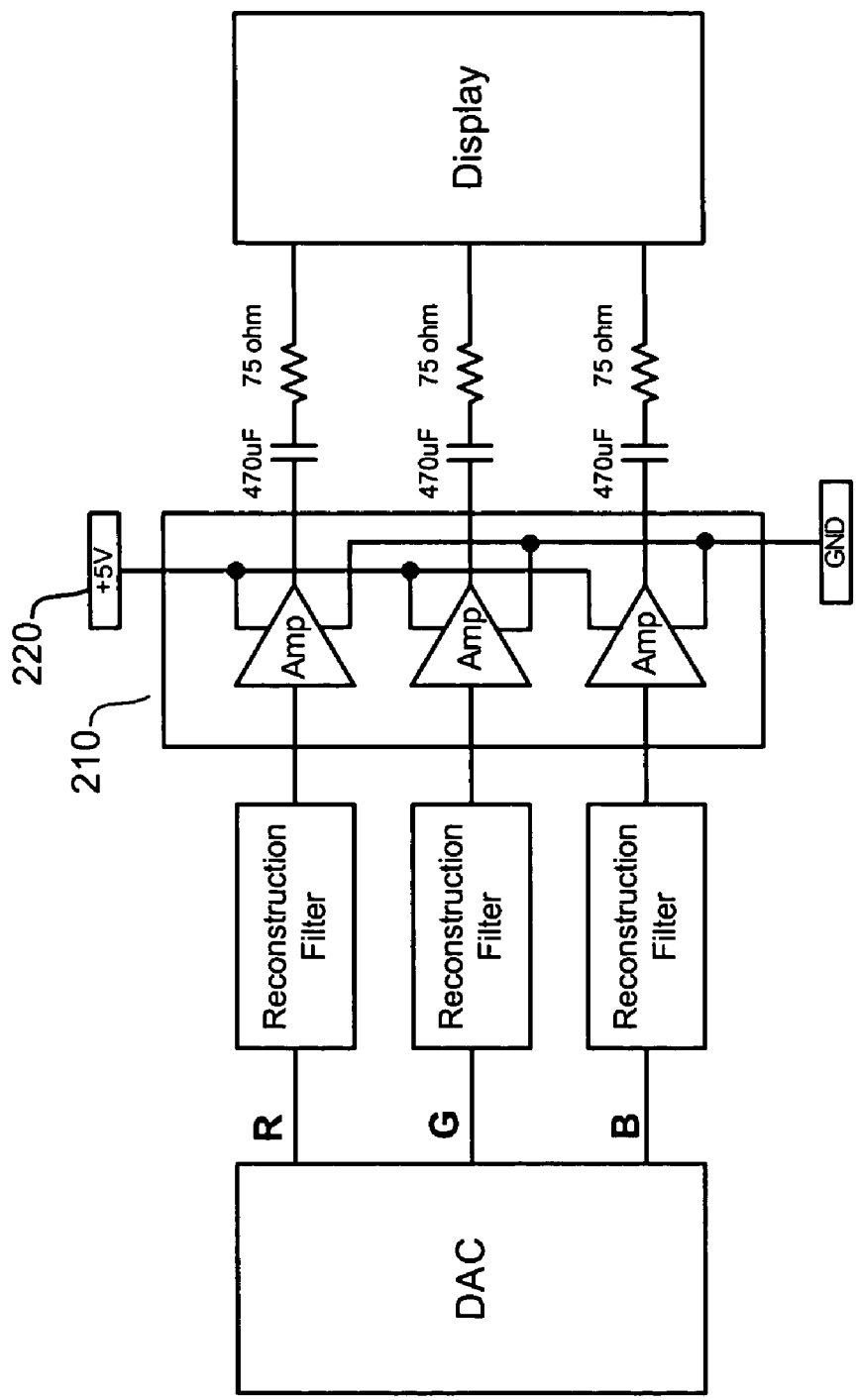
FIG. 2 is a high level diagram that is useful for describing a conventional video line driver that uses a single power supply, but requires large external capacitors.

A small external filter capacitor 316 (e.g., 0.1 nF) can be added to smooth out the switching noise from the charge pump 314. Such a capacitor is physically small and inexpensive compared to the large external capacitors discussed above with reference to FIG. 2.

Since a typical video signal is only about 1V peak-to-peak (when the video signal is centered around zero), the negative voltage produced by the charge pump 314 need only be large enough such that the amplifiers 312 can handle the video signals (e.g., which go as low as about −0.5V). Accordingly, in order to preserve power, the charge pump 314 can produce a negative voltage that has a lower amplitude (e.g., −1.5V) than the amplitude produced by the external positive voltage supply (e.g., 3.3V), while still allowing the transistors within the amplifiers 312 to operate properly.

When the positive rail voltage and the negative rail voltage are not centered around zero (e.g., if the positive and negative rail voltages are, respectively, +3.3V and −1.5V), then the outputs (Vout) of the amplifiers 312 may not be centered around zero. Accordingly, it would be beneficial if the outputs of the amplifiers 312 can be shifted as desired, so that the outputs can be centered around zero or any other desired voltage level. To accomplish this, in accordance with an embodiment of the present invention, the video line driver 310 can optionally include a bias reference input 318 to which a reference voltage (Vref) is supplied to shift the analog video level down an amount equal to the reference (e.g., 0.6V). If there is no desire to shift the output voltages (Vout), then the bias reference input 318 should be connected to ground.

In accordance with an embodiment of the present invention, the output voltage (Vout) of each amplifier 312 is substantially equal to the input voltage (Vin), which is presented at the non-inverting input of the amplifier 312, multiplied by the voltage gain (G) of the amplifier 312, minus the reference voltage (Vref) presented at the bias reference input 318. In other words, Vout=G*Vin−Vref. Assuming each amplifier 310 has a voltage gain of 2 (i.e., 6 dB), then Vout=2*Vin−Vref.

Figure 3B:
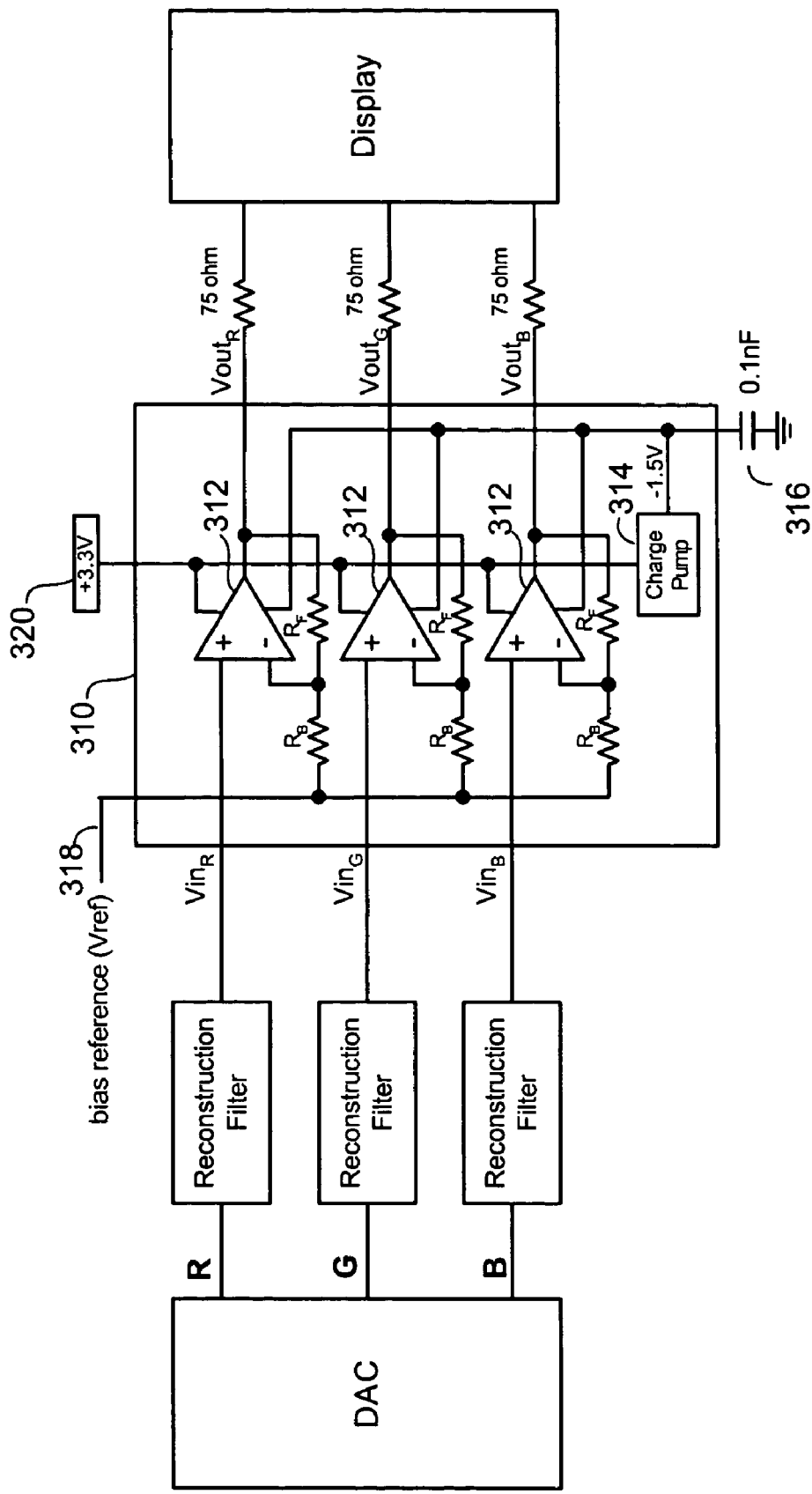

Additional details of the bias reference input 318 are shown in FIG. 3B. More specifically, FIG. 3B shows a feedback resistor $R_F$ connected between the output of each amplifier 312 and the inverting input of the amplifier 312. Also shown is a bias resistor $R_B$ connected between the inverting input of each amplifier and the bias reference input 318.

Figure 4:
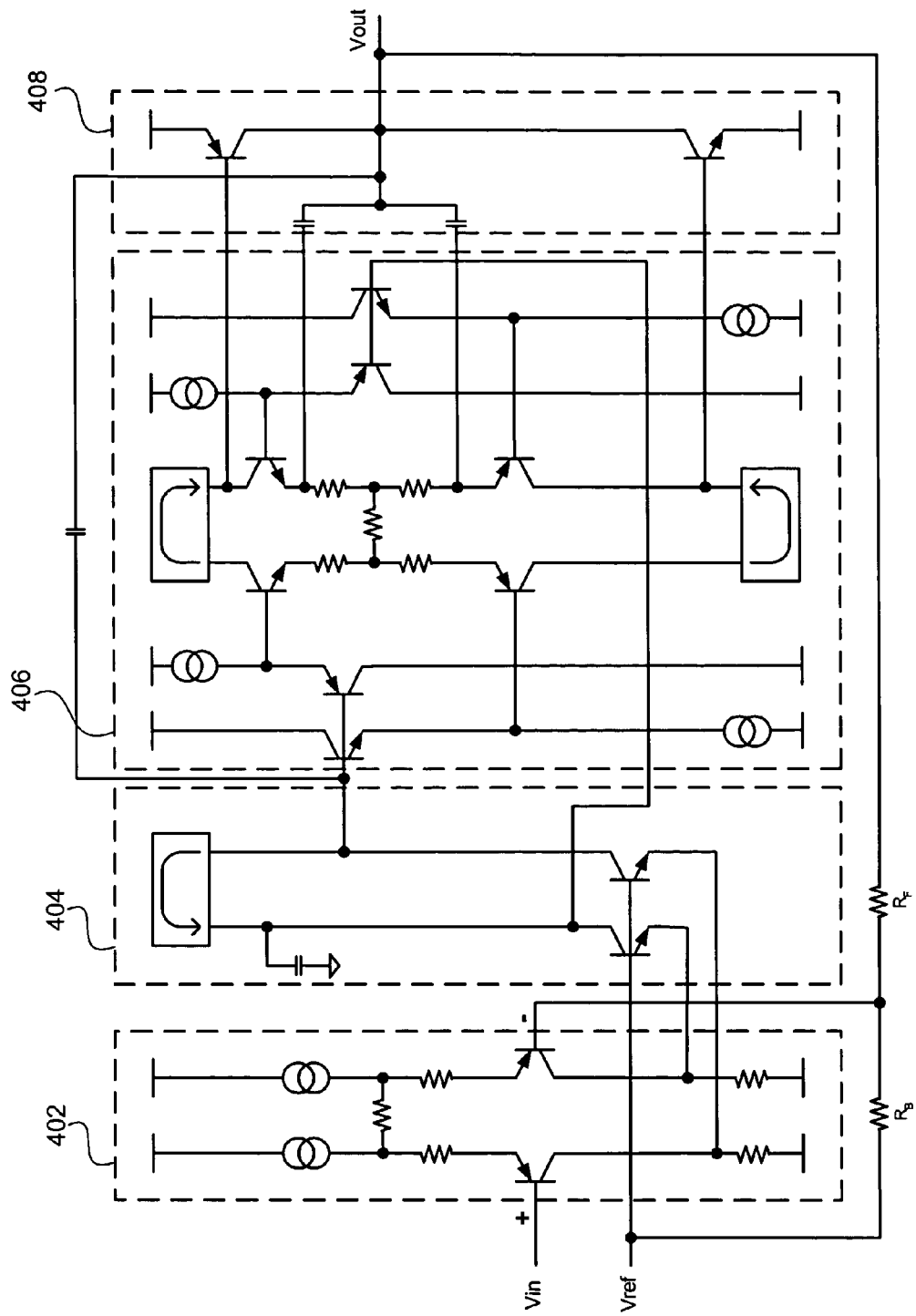
FIG. 4 is a circuit diagram of an amplifier that can be used in a video line driver of the present invention.

The video line driver 310 is illustrated as having three amplifiers 312. FIG. 4, illustrates an exemplary implementation of one such amplifier. Referring to FIG. 4, in accordance with an embodiment, each amplifier 312 includes an input stage 402, an isolation and bias stage 404, a gain stage 406 and an output stage 408. Also shown in FIG. 4 is are the feedback resistor $R_F$ and the bias resistor $R_B$. The high voltage rail (e.g., +3.3V) is provided by an external power supply. The low voltage rail (e.g., −1.5V) is generated by the charge pump 314, which is powered by the high voltage rail. This is just one exemplary implementation of an amplifier that can be used in video line drivers of the present invention. One of ordinary skill in the art reading this disclosure would understand that other implementations are possible that are also within the scope of the present invention. Accordingly, embodiments of the present invention are not limited to use of the amplifier shown in FIG. 4.

In the above described embodiments, the video line driver 310 was described as including three amplifiers 312 and a charge pump 314. This is preferably, because video signal is often separated into three separated channels or portions, e.g., an R portion, a G portion and a B portion, or a Y portion, a Pb portion and a Pr portion. In another embodiment of the present invention, a video line driver includes a charge pump 314 and a single amplifier 312. In still other embodiments, the video line driver includes a charge pump 314 and two amplifiers 312, or more than three amplifiers 312.

The forgoing description is of the preferred embodiments of the present invention. These embodiments have been provided for the purposes of illustration and description, but are not intended to be exhaustive or to limit the invention to the precise forms disclosed. Many modifications and variations will be apparent to a practitioner skilled in the art. Embodiments were chosen and described in order to best describe the principles of the invention and its practical application, thereby enabling others skilled in the art to understand the invention. Slight modifications and variations are believed to be within the spirit and scope of the present invention. It is intended that the scope of the invention be defined by the following claims and their equivalents.

What is claimed is:

1. A video line driver chip that operates using a single external positive supply voltage, comprising:
   a charge pump that uses the single external positive supply voltage to produce a negative voltage that has a lower amplitude than an amplitude of the positive external supply voltage;
   a plurality of amplifiers each of which are powered by the external positive supply voltage and the negative voltage produced by the charge pump; and
   a single reference voltage input that accepts a common external positive reference voltage for use by all of said amplifiers;
   wherein each said amplifier includes a first input, a second input and an output;
   wherein each said amplifier receives, at said second input of said amplifier, a voltage dependent on the common positive reference voltage accepted at said single reference voltage input; and
   wherein each said amplifier receives a different portion of a video signal at said first input of said amplifier;
   wherein each said amplifier outputs an amplified version of the received portion of the video signal, with its analog level shifted down by an amount substantially equal to the common external positive reference voltage accepted at said single reference voltage input, at said output of said amplifier; and
   wherein at least a significant portion of switching noise generated by the charge pump when producing the negative voltage is greater than 1 GHz, which is outside a frequency bandwidth of the video signal.

2. The video line driver chip of claim 1, wherein the video signal includes an R portion, a G portion and a B portion, and wherein the plurality of amplifiers include a first amplifier that receives the R portion, a second amplifier that receives the G portion, and a third amplifier that receives the B portion.

3. The video line driver chip of claim 1, wherein the video signal includes an Y portion, a Pb portion and a Pr portion, and wherein the plurality of amplifiers include a first amplifier that receives the Y portion, a second amplifier that receives the Pb portion, and a third amplifier that receives the Pr portion.

4. The video line driver chip of claim 1, wherein for each said amplifier:
said second input is connected to said output by a first resistor, and connected to the single reference voltage input of the video line driver chip by a second resistor.

5. The video line driver chip of claim 4, wherein switching performed by said charge pump is outside a frequency bandwidth of the video signal.

6. The video line driver chip of claim 1, wherein said charge pump is an inverter type charge pump.

7. The video line driver chip of claim 1, wherein switching performed by said charge pump is outside a frequency bandwidth of the video signal.

8. The video line driver chip of claim 1, wherein:
the common external positive reference voltage, which is accepted at the single reference voltage input that accepts, and which is used to specify a voltage received at said second input of each said amplifier, causes the amplified version of the portion of the video signal output by each said amplifier to have its analog level shifted down so that the amplified version of the portion of the video signal is substantially centered about zero.

9. A video line driver that operates using a single external supply voltage, comprising:
a charge pump that uses the single external supply voltage to produce a further voltage having an opposite polarity than the external supply voltage;
a plurality of amplifiers each of which are powered by the external supply voltage and the further voltage produced by the charge pump;
wherein each said amplifier receives a different portion of a video signal and outputs an amplified version of the received portion of the video signal;
wherein switching performed by said charge pump is outside a frequency bandwidth of the video signal; and
wherein switching performed by said charge pump is greater than 1 GHz.

10. The video line driver of claim 9, wherein switching performed by said charge pump is at least 3 GHz.

11. The video line driver of claim 9, wherein the external supply voltage is a positive voltage, and wherein said charge pump produces a negative voltage that has a lower amplitude than an amplitude of the positive voltage.

12. The video line driver of claim 9, wherein:
the further voltage and the external supply voltage are not centered about zero; and
a common external positive reference voltage, which is used to define a voltage received at said second input of each said amplifier, causes the amplified version of the portion of the video signal to have its analog level shifted down so that the amplified version of the portion of the video signal is substantially centered about zero.

13. A video line driver that operates using a single external supply voltage, comprising:
a charge pump that uses the single external supply voltage to produce a further voltage having an opposite polarity than the external supply voltage; and
an amplifier that is powered by the external supply voltage and the further voltage produced by the charge pump; and
wherein said amplifier receives a portion of a video signal and outputs an amplified version of the received portion of the video signal; and wherein switching performed by said charge pump is outside a frequency bandwidth of the video signal; and
wherein switching performed by said charge pump is greater than 1 GHz.

14. The video line driver of claim 13, wherein switching performed by said charge pump is at least 3 GHz.

15. The video line driver of claim 13, wherein the external supply voltage is a positive voltage, and wherein said charge pump produces a negative voltage that has a lower amplitude than an amplitude of the positive voltage.

16. The video line driver of claim 13, wherein:
said second input is connected to said output by a first resistor, and connected to a non-zero reference voltage input of the video line driver by a second resistor.

17. The video line driver of claim 13, wherein said charge pump is an inverter type charge pump.

18. The video line driver of claim 13, wherein:
the further voltage, produced by said charge pump using the external supply voltage, has a lower magnitude than the external supply voltage; and
a common external positive reference voltage, which is used to define a voltage received at said second input of each said amplifier, causes the amplified version of the portion of the video signal to have its analog level shifted down so that the amplified version of the portion of the video signal is substantially centered about zero.

19. The video line driver of claim 13, wherein:
the further voltage and the external supply voltage are not centered about zero; and
a common external positive reference voltage, which is used to define a voltage received at said second input of each said amplifier, causes the amplified version of the portion of the video signal to have its analog level shifted down so that the amplified version of the portion of the video signal is substantially centered about zero.

20. A method for amplifying a video signal using a single external positive supply voltage and a single external positive reference voltage, the video signal including an first portion, a second portion and a third portion, the method comprising:
powering a charge pump with the external positive supply voltage;
using the charge pump to produce a negative voltage that has a lower amplitude than an amplitude of the external positive supply voltage;
powering first, second and third amplifiers by the external supply voltage and the negative voltage produced using the charge pump;
accepting a the single external positive reference voltage for use by all of the amplifiers;
using the first amplifier and the single external positive reference voltage to produce an amplified version of the first portion of the video signal having its analog level shifted down by an amount substantially equal to the single external positive reference voltage;
using the second amplifier and the single external positive reference voltage to produce an amplified version of the second portion of the video signal having its analog level shifted down by an amount substantially equal to the single external positive reference voltage;
using the third amplifier and the single external positive reference voltage to produce an amplified version of the third portion of the video signal having its analog level shifted down by an amount substantially equal to the single external positive reference voltage; and
operating the charge pump such that at least a significant portion of switching noise generated, when using the charge pump to produce the negative voltage, is greater than 1 GHz, which is outside a frequency bandwidth of the video signal.

21. The method of claim 20, wherein the first, second and third portions of the video signal comprise, respectively, an R portion, a G portion and a B portion of the video signal.

22. The method of claim 21, wherein the first, second and third portions of the video signal comprise, respectively, an Y portion, a Pb portion and a Pr portion of the video signal.

23. The method of claim 20, wherein:
the step of using the first amplifier and the single positive reference voltage comprises using the first amplifier and the single positive reference voltage to produce an amplified version of the first portion of the video signal having its analog level shifted down so that the amplified version of the first portion of the video signal is substantially centered about zero;
the step of using the second amplifier and the single positive reference voltage comprises using the second amplifier and the single positive reference voltage to produce an amplified version of the second portion of the video signal having its analog level shifted down so that the amplified version of the second portion of the video signal is substantially centered about zero; and
the step of using the third amplifier and the single positive reference voltage comprises using the third amplifier and the single positive reference voltage to produce an amplified version of the third portion of the video signal having its analog level shifted down so that the amplified version of the third portion of the video signal is substantially centered about zero.

24. A method for amplifying a video signal using a single external supply voltage, the video signal including an first portion, a second portion and a third portion, the method comprising:
producing a further voltage having an opposite polarity than the external supply, the further voltage produced using a charge pump powered by the external supply voltage;
powering first, second and third amplifiers by both the external supply voltage and the produced further voltage; and
using the first, second and third amplifiers to produce an amplified version of the video signal;
wherein at least a significant portion of switching noise generated when producing the further voltage is greater than 1 GHz, which is outside a frequency bandwidth of the video signal.

* * * * *